(12) United States Patent
Higgins et al.

(10) Patent No.: US 6,218,995 B1
(45) Date of Patent: Apr. 17, 2001

(54) TELEMETRY ANTENNA SYSTEM

(75) Inventors: Sidney A. Higgins, Maple Grove; Eugene E. Welch, Waseca; Paul J. Jager, Waseca; Neil Hovelsrud, Waseca, all of MN (US)

(73) Assignee: Itron, Inc., Spokane, WA (US)

( * ) Notice: Subject to any disclaimer, the term of this patent is extended or adjusted under 35 U.S.C. 154(b) by 0 days.

(21) Appl. No.: 09/097,248

(22) Filed: Jun. 12, 1998

Related U.S. Application Data

(60) Provisional application No. 60/049,521, filed on Jun. 13, 1997, and provisional application No. 60/061,959, filed on Oct. 14, 1997.

(51) Int. Cl.$^7$ ...................................................... H01Q 1/04
(52) U.S. Cl. ...................... 343/719; 343/872; 340/870.02
(58) Field of Search ............................... 343/719, 700 MS, 343/872, 873; 340/870.01, 870.02; H01Q 1/04

(56) References Cited

U.S. PATENT DOCUMENTS

| | | | |
|---|---|---|---|
| 1,781,280 | 11/1930 | Haase et al. ......................... | 343/719 |
| 3,059,849 | 10/1962 | Saltzman ............................. | 235/91 |
| 3,475,755 | 10/1969 | Bassen et al. ........................ | 343/705 |
| 3,641,576 | 2/1972 | Farbanish ............................ | 343/743 |
| 3,729,727 | 4/1973 | Young et al. ......................... | 340/188 |

(List continued on next page.)

FOREIGN PATENT DOCUMENTS

| | | | |
|---|---|---|---|
| 0 252 184 A1 | 1/1988 | (EP) | ............................... H04B/5/00 |
| 4-155222 | 5/1992 | (JP) | ................................. G01F/15/06 |

OTHER PUBLICATIONS

Conformal Dielectric–Filled Edge–Slot Antennas with Inductive–Post Tuning, IEEE Transactions on Antennas and Propagation, vol. AP–27, No. 5, pp. 713–716, Sep. 1979.

*Primary Examiner*—Tho Phan
(74) *Attorney, Agent, or Firm*—Patterson, Thuente, Skaar & Christensen, P.A.

(57) ABSTRACT

A telemetry antenna system for transmitting data from underground utility meters includes a telemetry board, a radiator assembly connected to the telemetry board and a housing assembly for housing both the telemetry board and the radiator assembly. The radiator assembly preferably includes two metallic plates separated by an air gap dielectric and connected by a plurality of inductive shunts. Capacitive tuning pads are also included on the plates and are connected by shunts. The housing assembly preferably includes a cylindrical base having an integral annular ring. The base houses the telemetry board. The radiator assembly is operably connected to the telemetry board and is housed and located within a radome which sealingly engages the annular ring. The radome is sealingly secured to the annular ring of the base by a retaining ring which is tightly, releasably fastened to the annular ring of the base. The housing assembly may include additional elements such as an end cap, base lock, spine and/or bulkhead.

28 Claims, 14 Drawing Sheets

U.S. PATENT DOCUMENTS

| | | | |
|---|---|---|---|
| 3,913,400 | 10/1975 | Floren | 73/273 |
| 4,051,480 | 9/1977 | Reggia et al. | 343/705 |
| 4,085,287 | 4/1978 | Kullmann et al. | 178/66 R |
| 4,205,315 | 5/1980 | Fleenor | 343/720 |
| 4,229,745 | 10/1980 | Kruger | 343/771 |
| 4,230,234 | 10/1980 | Taylor | 220/18 |
| 4,303,923 | 12/1981 | Bitter, Jr. et al. | 343/771 |
| 4,305,078 | 12/1981 | Jones, Jr. et al. | 343/708 |
| 4,316,194 | 2/1982 | De Santis et al. | 343/700 MS |
| 4,463,354 | 7/1984 | Sears | 340/870.02 |
| 4,491,792 | 1/1985 | Bullock et al. | 324/157 |
| 4,491,793 | 1/1985 | Germer et al. | 324/157 |
| 4,518,965 | 5/1985 | Hidaka | 343/742 |
| 4,520,423 | 5/1985 | Sutherland | 361/380 |
| 4,633,262 | 12/1986 | Traut | 343/700 MS |
| 4,638,314 | 1/1987 | Keller | 340/870.02 |
| 4,672,386 | 6/1987 | Wood | 343/770 |
| 4,687,445 | 8/1987 | Williams | 343/719 |
| 4,709,239 | 11/1987 | Herrick | 343/700 MS |
| 4,758,836 | 7/1988 | Scuilli | 340/870.31 |
| 4,793,192 | 12/1988 | Jerger et al. | 73/861.78 |
| 4,801,944 | 1/1989 | Madnick et al. | 343/744 |
| 4,847,626 | 7/1989 | Kahler et al. | 343/700 MS |
| 4,868,566 | 9/1989 | Strobel et al. | 340/870.3 |
| 4,998,102 | 3/1991 | Wyler et al. | 340/870.02 |
| 5,041,838 | 8/1991 | Liimatainen et al. | 343/700 MS |
| 5,153,600 | 10/1992 | Metzler et al. | 343/700 MS |
| 5,155,481 | 10/1992 | Brennan, Jr. et al. | 340/870.02 |
| 5,298,894 | 3/1994 | Cerny et al. | 343/870.02 |
| 5,371,496 | 12/1994 | Tanamachi | 343/870.28 |
| 5,382,959 | 1/1995 | Pett et al. | 343/700 MS |
| 5,438,338 | 8/1995 | Thill | 343/700 MS |
| 5,539,418 | 7/1996 | Egashira et al. | 343/712 |
| 5,579,020 | 11/1996 | Kinsey | 343/776 |
| 5,583,492 | 12/1996 | Nakanishi et al. | 343/870.02 |
| 5,600,333 | 2/1997 | Justice et al. | 343/713 |
| 5,659,300 | 8/1997 | Dresselhuys et al. | 340/870.02 |
| 5,825,303 * | 10/1998 | Bloss et al. | 340/870.02 |

* cited by examiner

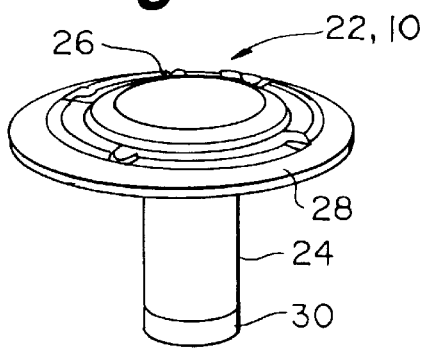
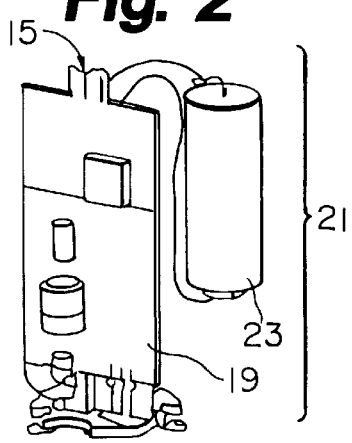
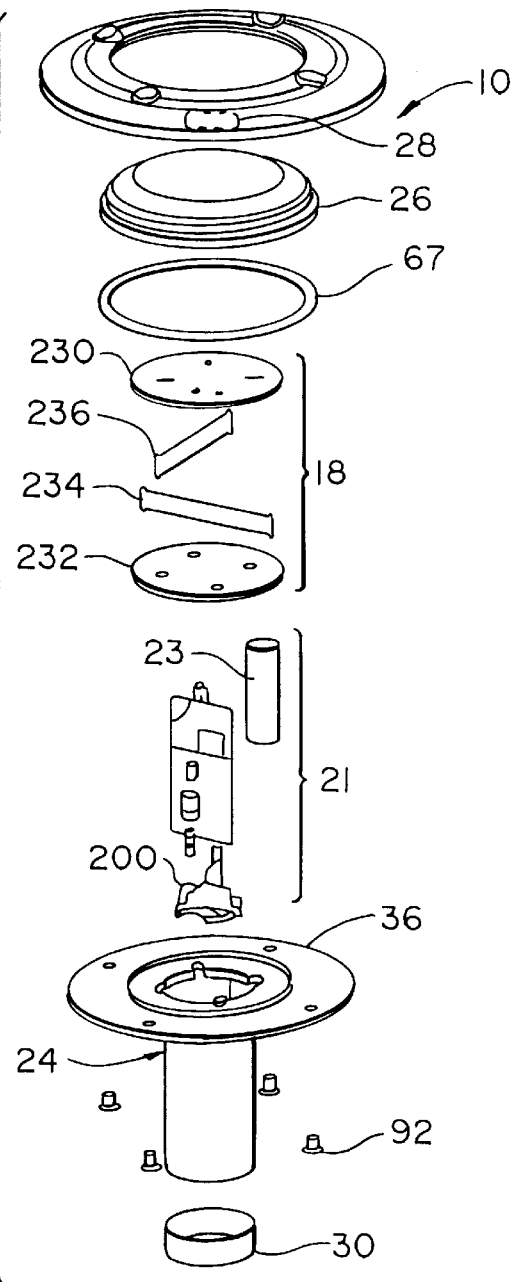

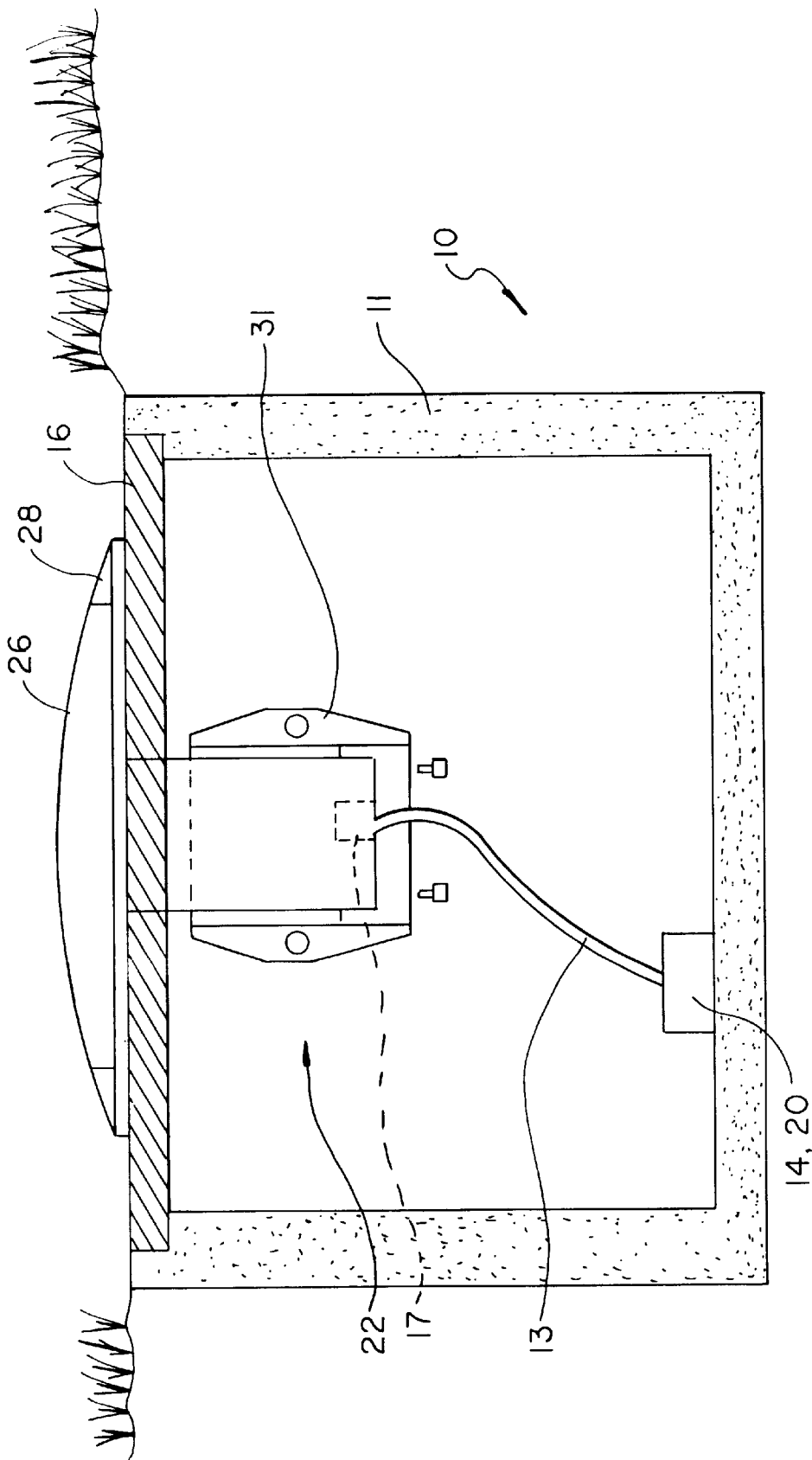

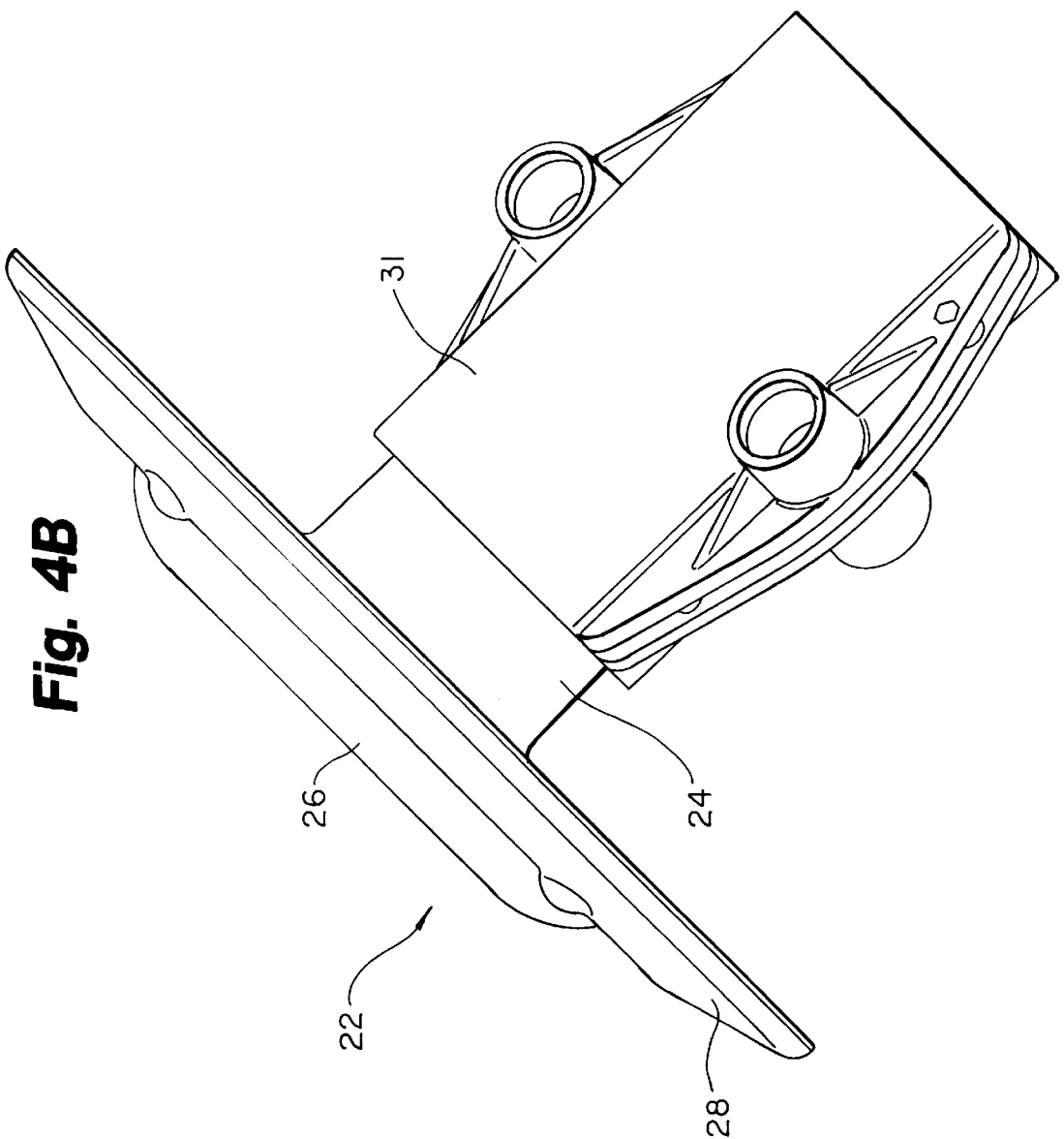

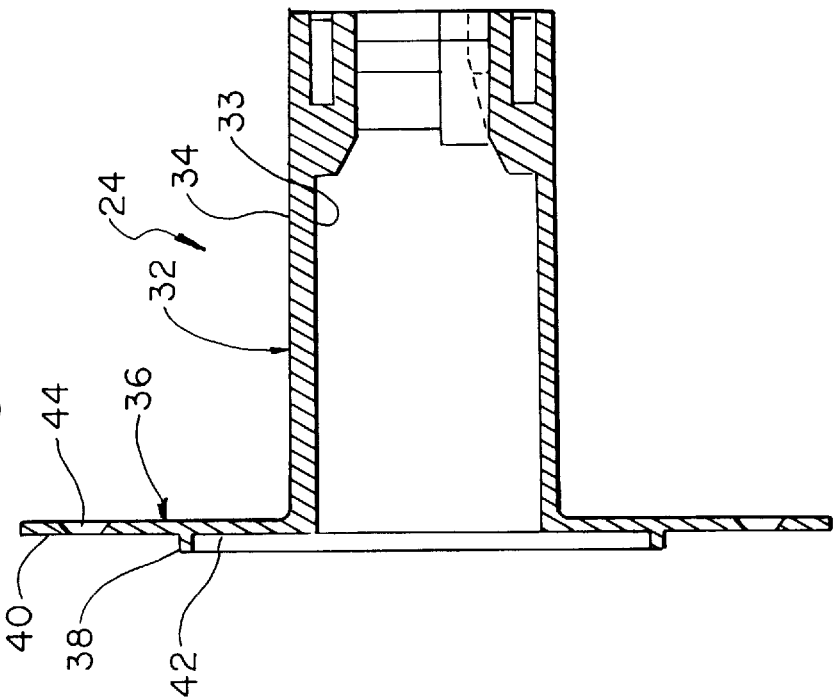
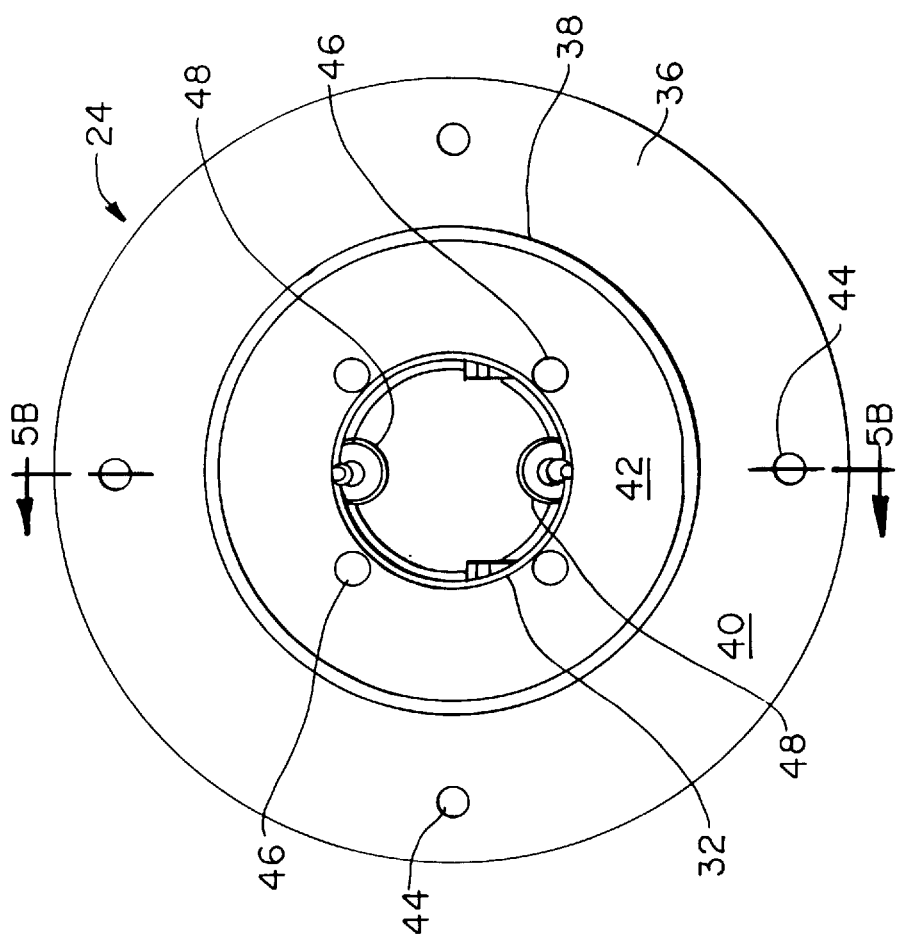

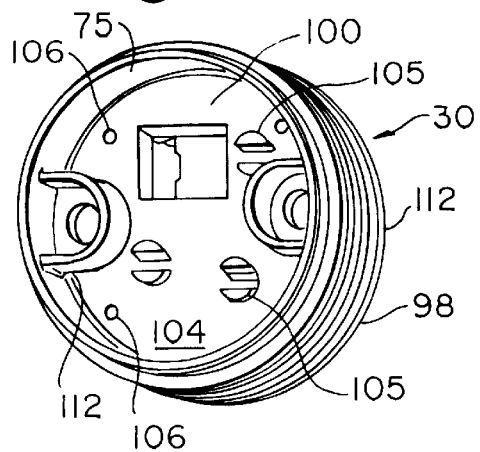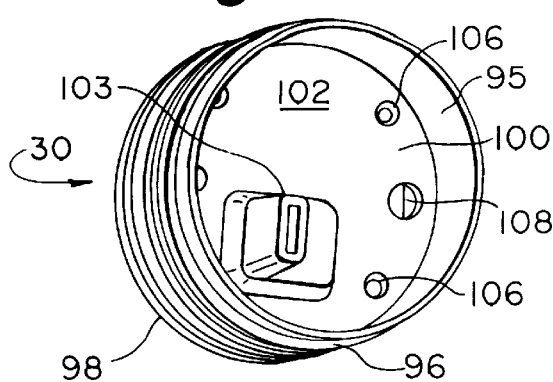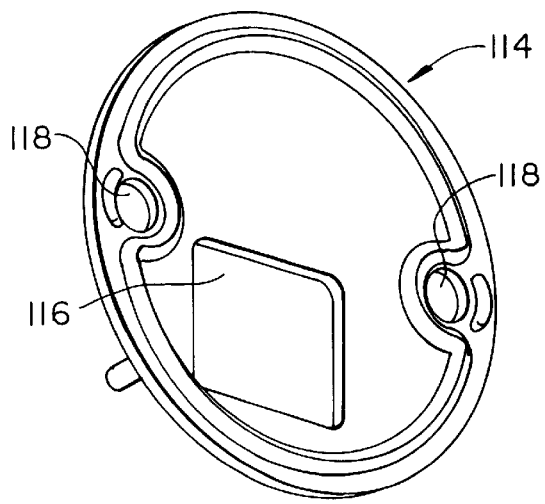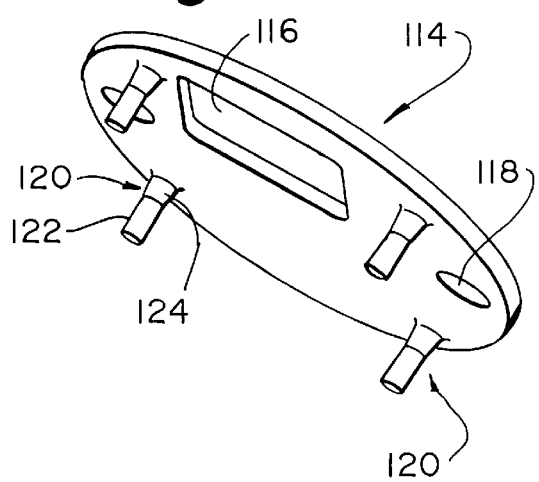

TELEMETRY ANTENNA SYSTEM

CLAIM TO PRIORITY

This application claims priority to earlier filed United States Provisional Application Nos. 60/049,521, filed Jun. 13, 1997, and 60/061,959, filed Oct. 14, 1997.

FIELD OF THE INVENTION

This invention relates to radio telemetry and more particularly, to radio telemetry for underground devices such as water meters, gas meter, valves and so on.

BACKGROUND OF THE INVENTION

Numerous underground devices such as water meters, gas meters, valves and so on, use radio telemetry for the transfer of data from the meters and/or valves to a handheld computer, fixed network or other mobile reading technology. When providing radio telemetry for these underground devices it is often necessary to place a telemetry antenna at surface level, e.g. on the lawn, sidewalk driveway, pavement, or atop a utility vault or lidded pit, and/or below grade. The surface level location of the antenna can subject the antenna to severe weather conditions as well as to other open exposure conditions such as harsh chemicals and the footsteps of people and animals. Thus, the unit containing the antenna is desirably small, rugged, weather resistant and has a very low profile.

Units containing the telemetry antennas are usually battery operated and may be randomly placed within a data-collection network. In view of these operating conditions, it is desirable for the telemetry antenna to have high efficiency and a near omni-directional radiation pattern. Further, it is desirable to obtain highly uniform electrical performance from the telemetry antenna when mounted upon various dielectric, metal and combination surfaces. Thus, the use of a shielded electronic housing, a substantial integral ground plane, and a sealed radome are desirably used in combination with the telemetry antenna. Additionally, it is desirable that the telemetry antenna's frequency range have the ability to meet varying domestic and foreign telemetry band allocations by altering tuning and matching elements without multiple component changes and costly tooling alterations. In addition to the above-desired features, it is also desirable that the telemetry antenna system be adapted to excitation at off-axis locations.

Currently, there are no telemetry antenna systems which meet a substantial number of the above-listed desires. Thus, there is a need for a telemetry antenna system that can address many, if not all, of the preferred and desired features.

SUMMARY OF THE INVENTION

The above-described desirous features are in large part addressed by a telemetry antenna system of the present invention. A telemetry antenna system of the present invention preferably comprises a telemetry board, e.g. an encoder/receiver/transmitter or ERT®, a radiator sub-assembly and a housing. The telemetry board operates to perform the functions of control, reception of RF signals, transmission of RF signals, and data management. In transmitting meter data, and/or other appropriate data, the signal from the telemetry board is radiated out through the radiator sub-assembly.

The radiator sub-assembly comprises two parallel metal surfaces about an air gap dielectric. Specifically, the radiator sub-assembly comprises two metal-coated disks that are separated by air and by an interlocking shunt board and spacer board. The shunt board is preferably provided with five parallel pairs of inductive tuning shunt traces while the spacer board is provided with a parallel pair of strip inductors for connecting capacitor pads on the inner surfaces of the disks. With this configuration, the need to tune and match elements to tailor the antenna's frequency range to meet varying domestic and foreign telemetry band allocations may be performed without multiple component changes and costly tooling alterations.

The telemetry board, its antenna and battery power source, and the radiator sub-assembly are safe-guarded within the housing assembly. The housing assembly incorporates a base comprising a metal or metallized plastic cylinder with an integral annular plate which functions as a rugged, shielded container for the belowgrade circuitry, battery and wiring and provides a rugged, low profile above-grade ground plane as part of the antenna and radiator sub-assembly system, so as to make antenna patterns and electrical characteristics relatively independent of the surface onto which the housing and its enclosures are mounted. The housing assembly further functions as a radio shield, reducing unwanted emissions to acceptable levels. The base further incorporates features to accommodate an end-cap and a base lock. The housing assembly further incorporates a radome that is preferably a lowloss, tough plastic cover, e.g. glass-reinforced polyethylene, with precise locating, support and seal features. An o-ring is placed between the radome and the annular plate to create a seal and prevent moisture seepage into the cylinder. A retaining ring is drawn securely down on the radome by several screws so as to tightly clamp the radome and o-ring to effect a reliable water-tight seal. The retainer ring is contoured so as to smoothly blend the radome and base outlines together. Thus, described herein is a telemetry antenna system with a connector-less feed arrangement that is capable of exciting the structure at off-axis locations.

DESCRIPTION OF THE DRAWINGS

FIG. 1A is an assembly view of a telemetry antenna system of the present invention including a housing assembly, an electronic sub-assembly, and a radiator sub-assembly FIG. 1B is an exploded perspective view of the assembly of FIG. 1A.

FIG. 2 is a perspective view of the electronic sub-assembly including a telemetry board and a battery.

FIG. 3 illustrates an underground enclosure housing a water line and meter equipped with a housing assembly according to the present invention.

FIGS. 4A and 4B are perspective views of a housing assembly of the present invention.

FIG. 5A is a top view of a base of the present invention.

FIG. 5B is a side section view of the base of the present invention taken along line 5B—5B of FIG. 5A.

FIGS. 8A and 8B are bottom and top perspective views, respectively, of an end cap of the present invention.

FIGS. 9A and 9B are top and bottom perspective views, respectively, of a gasket of the present invention.

DETAILED DESCRIPTION OF THE PREFERRED EMBODIMENTS

Figure 4A:
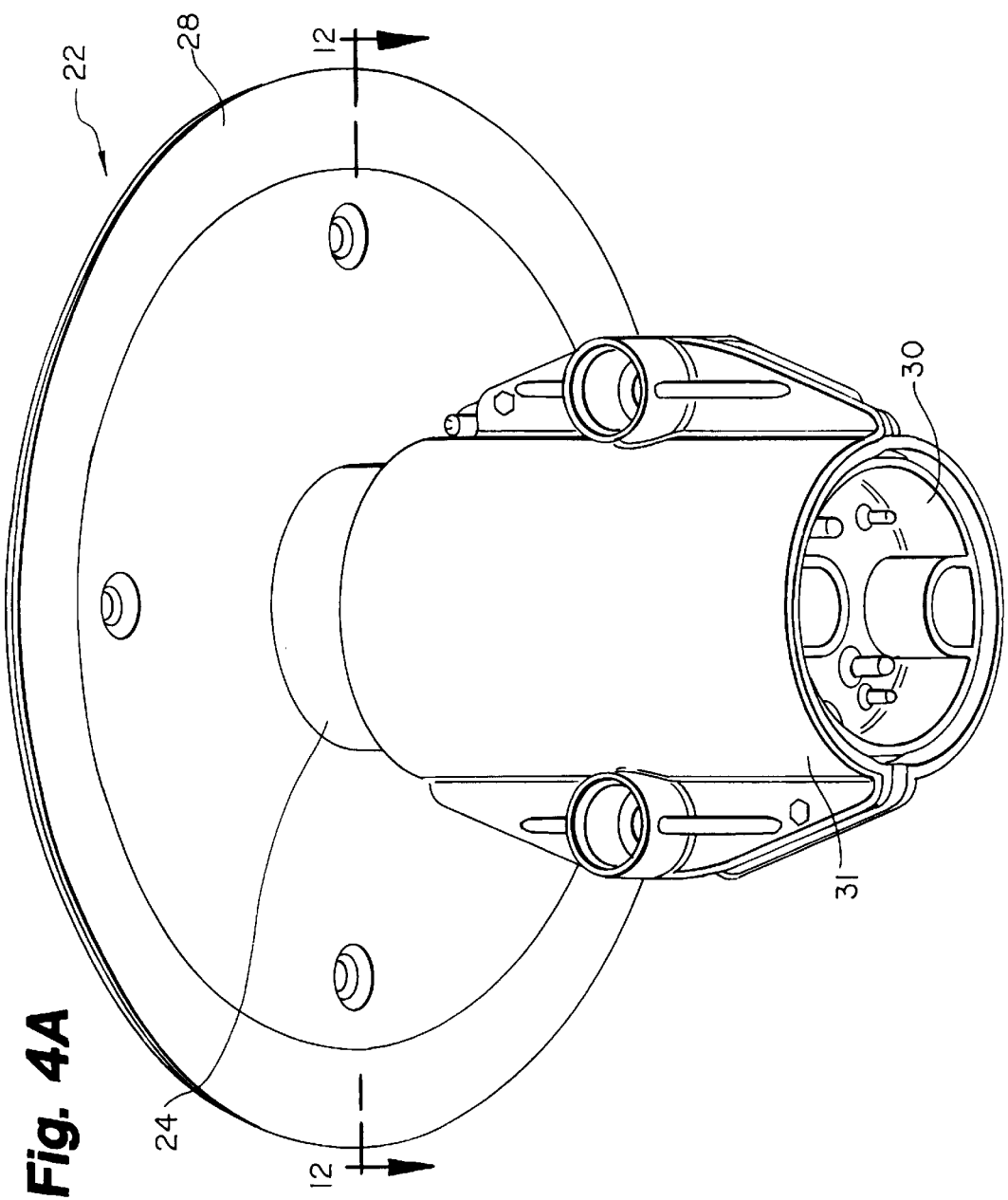

FIGS. 1A, 1B, and 2 illustrate a telemetry antenna system 10. The telemetry antenna system 10 preferably incorporates a radiator sub-assembly 18, an electronic sub-assembly 21 including a battery 23 and a telemetry board 19 with antenna feed connection 15, and a housing assembly 22.

FIG. 3 depicts an example of one use of telemetry antenna system 10. Here, an underground enclosure 11, commonly referred to as a pit, is illustrated having sidewalls 12 and a pit lid 16. A water meter 14, or other utility meter, is installed with register 20 inside of pit 11. A base of housing assembly 22 is illustrated generally suspended from pit lid 16 with a radome 26 and a retaining ring 28 in place. Housing assembly 22 is connected to register 20 via cable 13, cable connector 17 and appropriate potting material. Upon receiving a coded wakeup signal, telemetry board 19 within telemetry antenna system 10 preferably transmits an encoded identification as well as utility meter data several times and then returns to a standby mode awaiting further polling by a host. Data transmission is obtained through RF communication, preferably in the 900 MHz band, however, greater or lesser frequencies may be used without departing from the spirit or scope of the present invention.

FIGS. 4A and 4B illustrate housing assembly 22 in greater detail. The housing assembly 22 generally comprises a base 24, a radome 26, a retaining ring 28, an end cap 30 and a base lock 31.

Base 24 is shown in greater detail in FIGS. 5A and 5B. Base 24 comprises a cylindrical center portion 32 and an annular plate 36 integral to cylindrical portion 32. Cylindrical center portion 32 is used to house portions of the electronic sub-assembly 21 while annular plate 36 serves as the supporting member as it rests atop the pit lid 16 and supports that portion of the housing assembly 22 that hangs below the pit lid 16. The metal or metallized cylindrical center portion 32 serves to shield unwanted radio emissions while the metallic annular plate 36 serves as a constant ground plane to provide robust antenna performance. Cylindrical center portion 32 maintains a central bore therethrough and is defined interiorly by an inside wall 33 and exteriorly by an outside wall 34. While base 24 may be of any appropriate dimensions, the preferred embodiment of base 24 finds the length of cylindrical center portion to be approximately three and one-half inches. The thickness between walls 33 and 34 is approximately one-tenth of an inch. The diameter of the central bore is appropriately approximately 1.6 inches, sized to receive the end cap 30 (described below).

Annular plate 36 incorporates an annular lip or ridge 38 which thereby defines an outer section 40 of annular plate 36 and an inner section 42 of annular plate 36. Annular plate 36 is preferably approximately 5.5 inches in diameter with annular lip 38 approximately 3.3 inches in diameter. Spaced equidistantly around outer section 40 are a plurality of holes 44 for insertion of screws or other securement devices. Similarly, a plurality of bosses 46 are spaced equidistantly around inner section 42 and serve to align radiator/antenna sub-assembly 18 contained in radome 26. Bosses 46 also provide mechanically solid points where tooling ejection pins may push and may be used for direct electrical connection points to base 24. Extending from inside wall 33 are two coupling supports 48; the coupling supports 48 are adapted to receive screws or other securement devices that are used in removably securing end cap 30 to base 24.

Figure 6A:
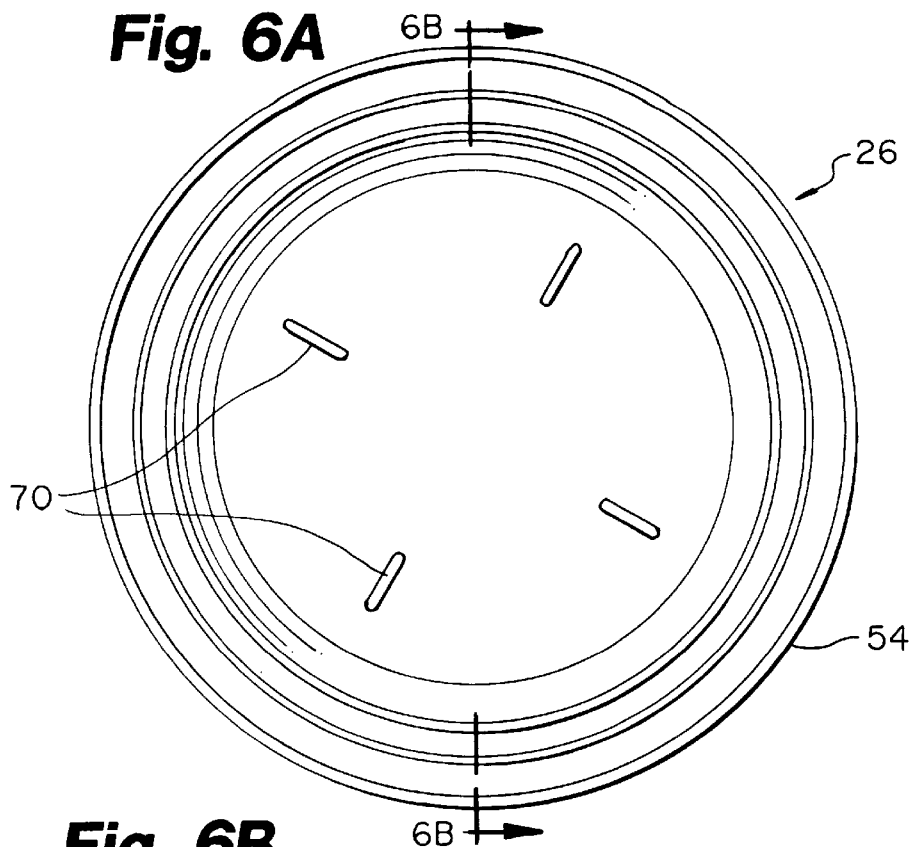
FIG. 6A is a bottom view of a dome of the present invention.
Figure 6B:
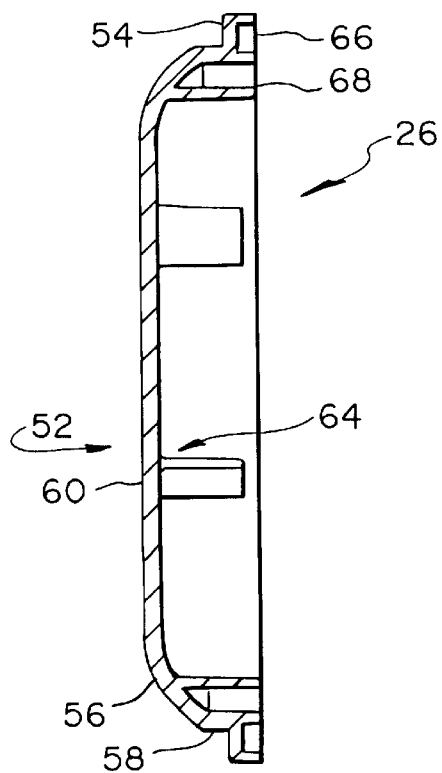
FIG. 6B is a sectional view of the dome taken along line 6B—6B of FIG. 6A.
Figure 6C:
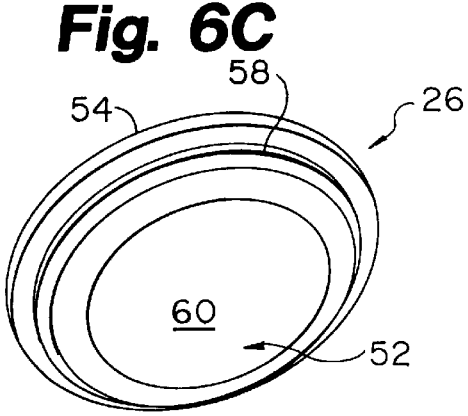
FIG. 6C is a perspective view of the dome of the present invention.

Radome 26 is shown in greater detail in FIGS. 6A, 6B and 6C. An exterior 52 of radome 26 is defined by an annular outer ring 54 and a cap 56 integral with annular outer ring 54. In keeping with the above-described dimensions, annular outer ring 54 is preferably approximately 4.3 inches in diameter while cap 56 has an overall diameter of approximately 3.9 inches. Cap 56 comprises a side portion 58 that is substantially perpendicular to annular outer ring 54 and a top portion 60 that is substantially flat but rounds downward and smoothly into side portion 58. An interior 64 of radome 26 is generally defined by an o-ring groove 66 or potting groove and a seating ring 68. 0-ring groove 66 is substantially located within annular outer ring 54. Seating ring 68 extends downward from cap 56 at approximately the point at which top portion 60 rounds into side portion 58. Seating ring 68 when in position in the assembly 22 rests proximate outer annular lip edge 38 and is, thus, prevented from sliding along base 24. Seating ring 68 and o-ring groove 66 form a sealant pocket which when filled with an appropriate potting material will form a secondary seal. Interior 64 of radome 26 further incorporates a plurality of rectangularly shaped tabs 70 that are spaced equidistantly around the interior of cap 56. Tabs 70 are approximately 0.5 inches in height, 0.4 inches in length and 0.07 inches in width. Tabs 70 are multi-purpose; they support radome 26 as well as retain and locate radiator sub-assembly 18.

Figure 7A:
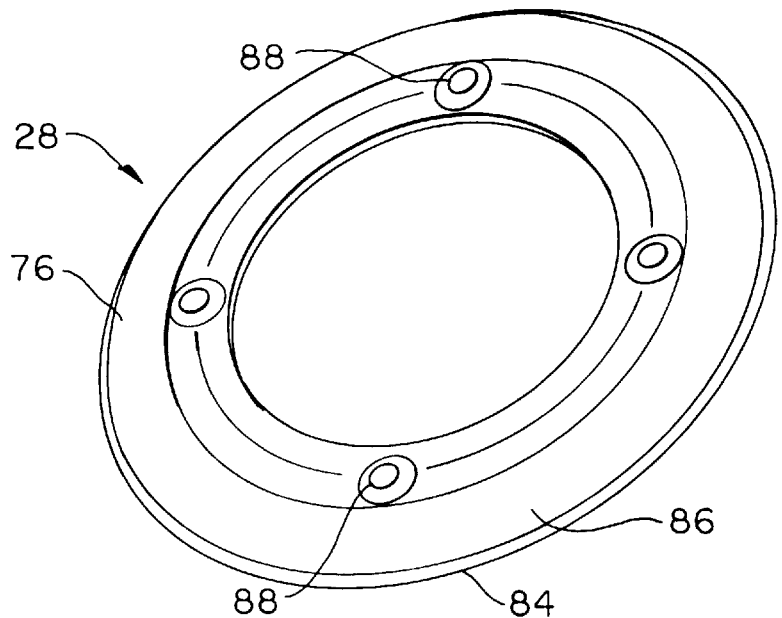
FIG. 7A is a top perspective view of a retainer ring of the present invention.
Figure 7B:
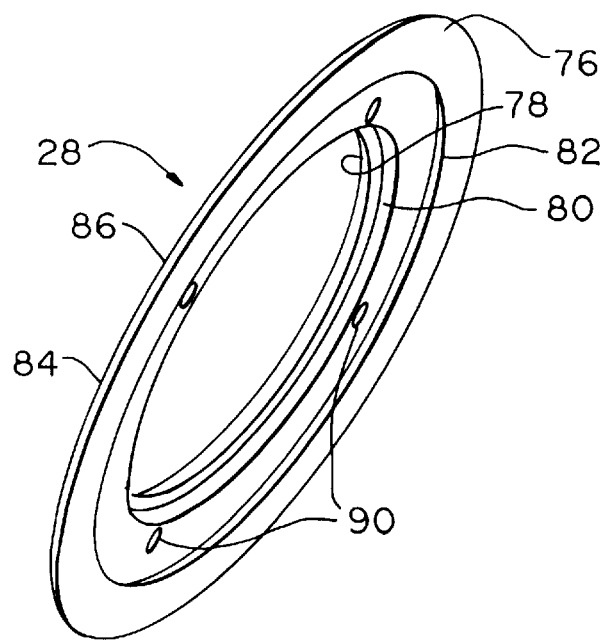
FIG. 7B is a bottom perspective view of the retainer ring of the present invention.

Retaining ring 28 is shown in greater detail in FIGS. 7A and 7B. Retaining ring 28 generally comprises an annular plate 76. Annular plate 76 incorporates a first-side edge 78 that defines a diameter of approximately 3.9 inches and is adapted to rest proximate radome side portion 58. Annular plate 76 includes a second-side edge 80 that defines a diameter of approximately 4.3 inches and is adapted to rest proximate annular outer lip 54. Annular plate 76 includes a third side-edge 82 that defines a diameter of approximately 5.5 inches and is adapted to rest proximate annular plate 36 of base 24. Annular plate 76 is further defined by an outside edge 84 that is approximately 6.7 inches in diameter. Outside edge 84 ramps up to a top portion 86 having a plurality of rounded contours 88 that are spaced equidistantly about annular plate 76. Below each rounded contour 88 is defined a cavity 90 adapted to accept a fastening device such as a screw. The screws 92 (shown in FIG. 1B) are inserted through holes 44 of base 24 and into cavities 90 so as to maintain radome 26 in releasably secured position to base 24.

End cap 30 is shown in greater detail in FIGS. 8A and 8B. End cap 30 is cylindrical in shape and is sized to slidably surround the lower portion of base 24. End cap 30 incorporates a smooth internal wall 95 and an external wall 96 that has a threaded surface 98. Located centrally within end cap 30 is plate 100. Plate 100 has a top face 102 incorporating a protruding elongate channel 103 and a bottom face 104 incorporating a plurality of protruding undercuts 105. Channel 103 allows for retention and precise location of cable connector 17 (allowing for easy match up of cable connector 17 contacts to telemetry board 19 contacts) and also enables easy potting of assembly 22 while undercuts 105 provide surfaces for the potting to lock onto thereby also enabling easy potting. Channel 103 further employs a keying feature which prevents incorrect installation of wire connector 17. The configuration of channel 103 also helps in sealing off end cap 30 preventing moisture seepage. A plurality of holes 106 are provided within plate 100 as are two securement holes 108. Extending from internal wall 95 and below bottom face 104 are coupling supports 112. Coupling supports 112 are located directly below securement holes 108 and allow for insertion of a securement screw.

A gasket 114 adapted for end cap 30 is shown in greater detail in FIGS. 9A and 9B. Gasket 114 is provided with a channel hole 116 adapted to fit around channel 103. Gasket 114 is further provided with a plurality of securement holes 118 which are aligned with securement holes 108 of end cap 30. A plurality of gasket stoppers 120 or alternatively, locators, one per hole 106, extend outward from gasket 114. Stoppers 120 incorporate a slender neck portion 122 and a bulbous portion 124. Neck portion 122 and bulbous portion 124 are pushed through hole 106, bulbous portion 124 preventing stoppers 120 from slipping back out through hole 106. The configuration of gasket 114 is adapted to prevent moisture seepage; as such it is appropriately made of a material, like rubber or silicone, capable of providing this effect.

Figure 10A:
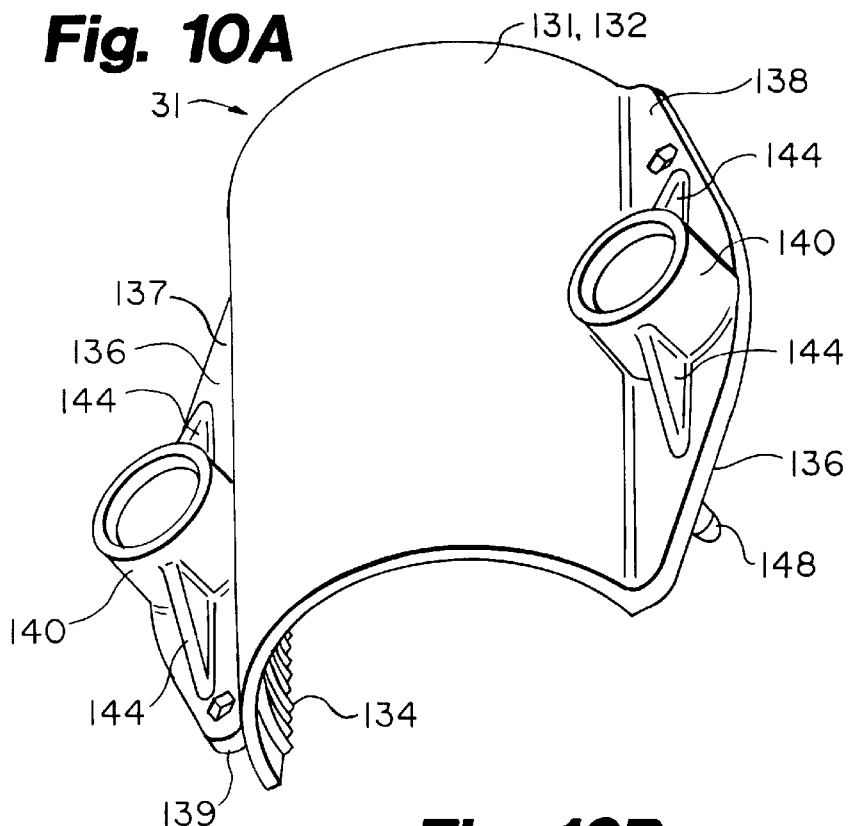
FIGS. 10A and 10B are outer and inner perspective views, respectively, of a base lock of the present invention.
Figure 10B:
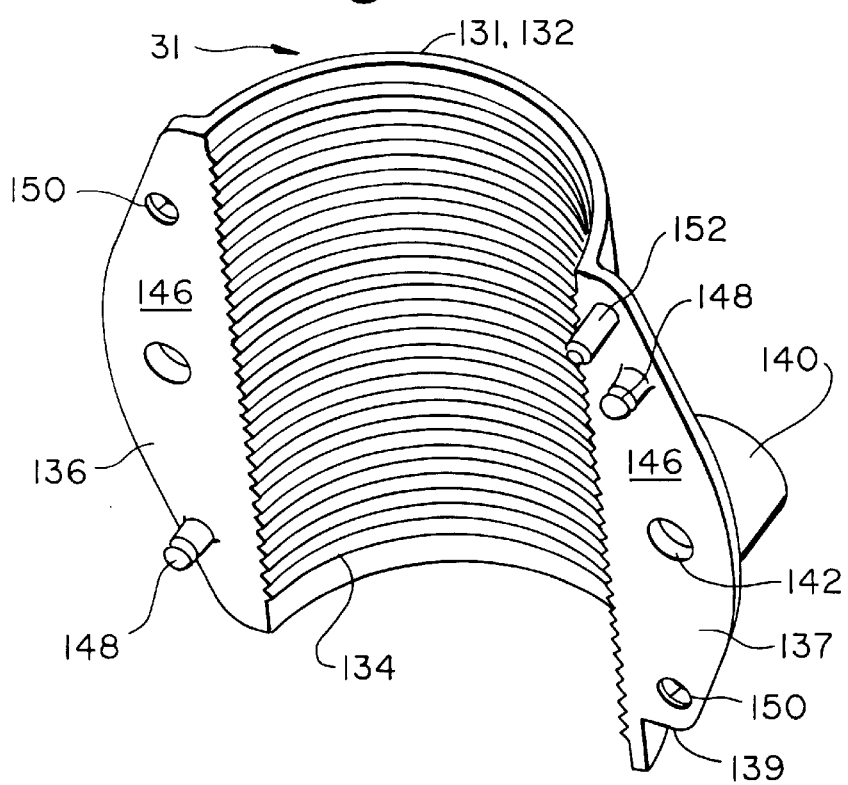

Base lock 31 is shown in greater detail in FIGS. 10A and 10B. Base lock 31 is generally cylindrical in shape wherein the cylinder is comprised of two half portions 131, 132 that are identical. Each half portion 131, 132 includes an interior threaded surface 134. Adjacent and integral to threaded surface 134 is a first winglike extension 136 and a second winglike extension 137, each having an exterior surface 138. Note that winglike extension 137 is cut short on one side providing a flat surface edge 139. Located on and integral to the exterior surface 138 is a cylindrical shroud 140 having a bore therethrough. Shroud 140 is positioned over a hole 142 that is centrally positioned within winglike extension 136, 137; the diameter of hole 142 being considerably smaller than the diameter of the bore through shroud 140. Support flanges 144 ramp downward from shroud 140 to exterior surface 138 and are integral with shroud 140 and surface 138. An interior surface 146 of winglike extensions 136, 137 is defined by a plurality of locking pins 148 that interlock with interlocking holes 150. An additional pin 152 is provided and extends underneath surface edge 139 when locked in position.

Figure 11A:
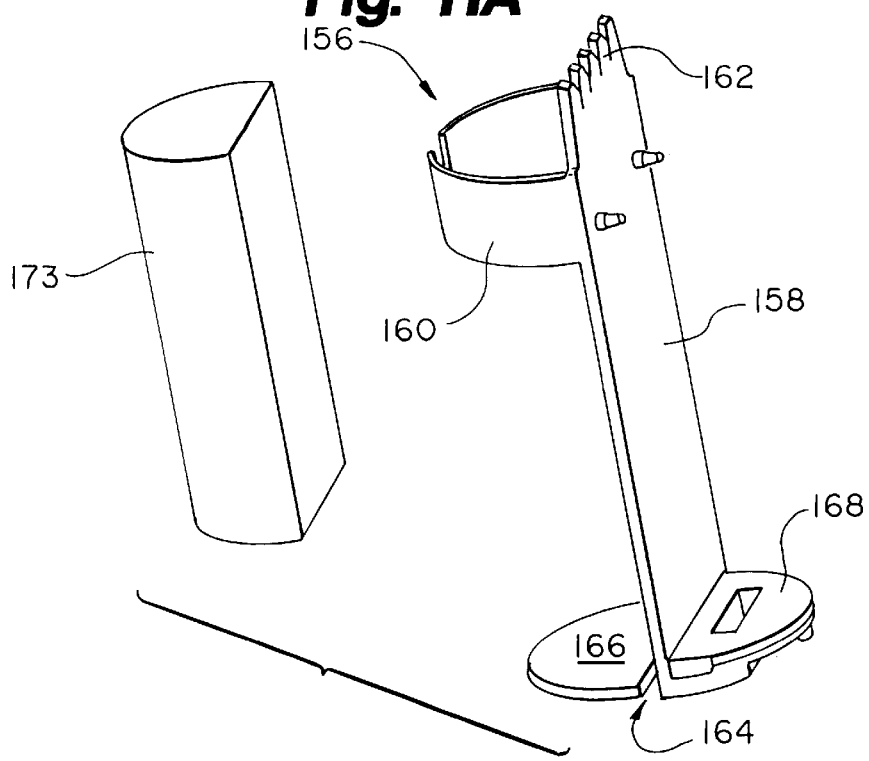
FIG. 11A is a perspective view of a spine of the present invention.

A spine 156 is preferably incorporated into assembly 22 and is shown in detail in FIG. 11A. Spine 156 includes a central planar plate 158 whose length is appropriate to fit within cylindrical center portion 32. Extending outward from plate 158 are arms 160. Arms 160 are rounded to conform to the cylindrical center portion 32. Across the top of plate 158 may be found a plurality of notched portions 162. At the bottom of plate 158 may be found a circular bottom plate 164 that is divided into a first portion 166 and a second portion 168. First portion 166 is adapted to rest proximate gasket 114 atop central plate 100. Second portion 168 is adapted to rest proximate gasket 114 atop central plate 100 while also conformed to fit around channel 103 and any connector therein. Spine 156 may be used to support telemetry board 19 (shown in FIG. 2) or may be added simply to provide structural rigidity to assembly 22 and/or provide extra moisture protection to board 19. Note that a battery/foam retainer 173 may also be appropriately included within cylindrical center portion 32.

Figure 11B:
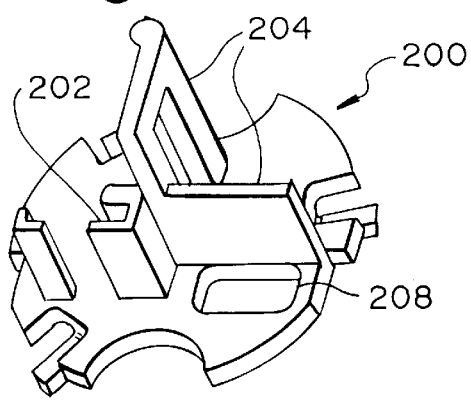
FIGS. 11B, 11C and 11D present multiple perspective views of a bulkhead, an alternative to the spine.
Figure 11C:
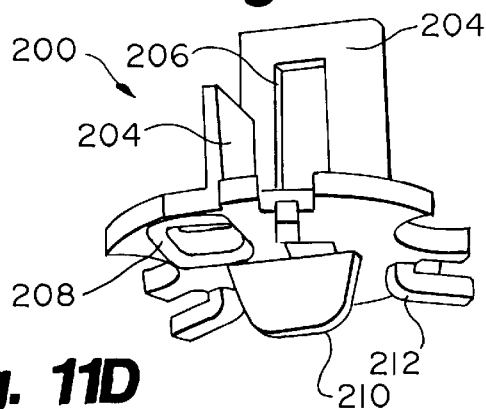
Figure 11D:
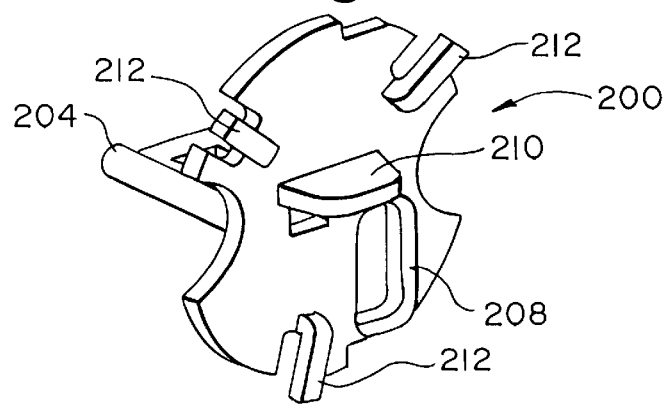

FIGS. 11B, 11C and 11D depict an alternative to spine 156 namely, a bulkhead 200. Bulkhead 200 is also shown in the assembly of FIG. B. Bulkhead 200 incorporates a board locator/retainer 202 for locating and retaining telemetry board 19, battery retaining walls 204 creating a zone in which battery 23 is kept, a slot 206 for a cable tie, a receptacle 208 for protruding elongate channel 103 which also provides a one-way assembly keying feature for end cap 30, a tang 210 for easy removal of bulkhead 200 during battery 23 change out, and a three-standoff feed 212 that is laid out in such a way as to allow only one orientation in the base 24.

Housing assembly 22 is designed to house both electronic sub-assembly 21 and radiator sub-assembly 18. Radiator sub-assembly 18, shown more specifically in FIGS. 13–16, preferably incorporates a top disk 230, a bottom disk 232, a shunt board 234 and a spacer board 236.

Figure 13A:
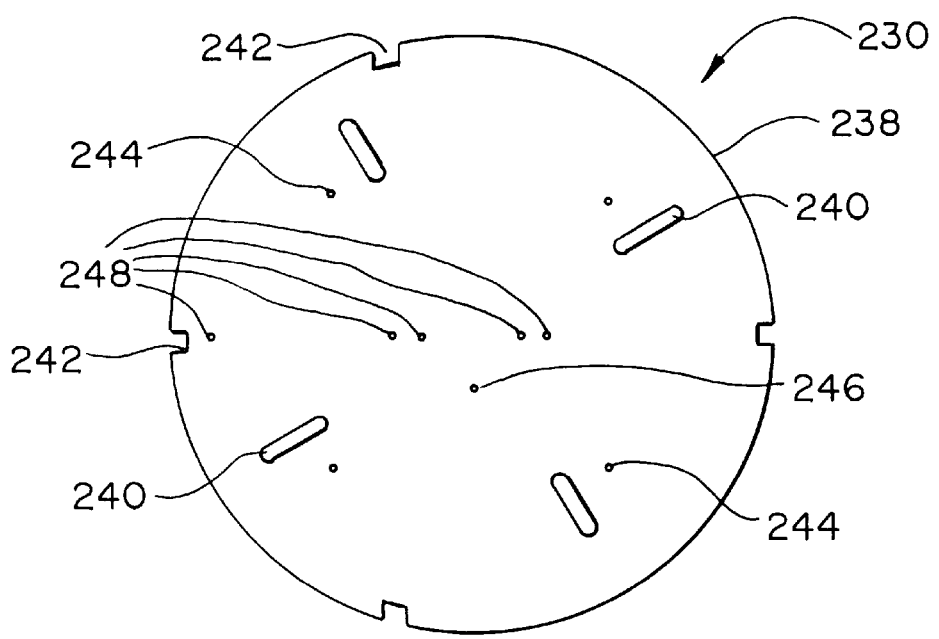
FIG. 13A is a top view of a top disk of the radiator sub-assembly.
Figure 13B:
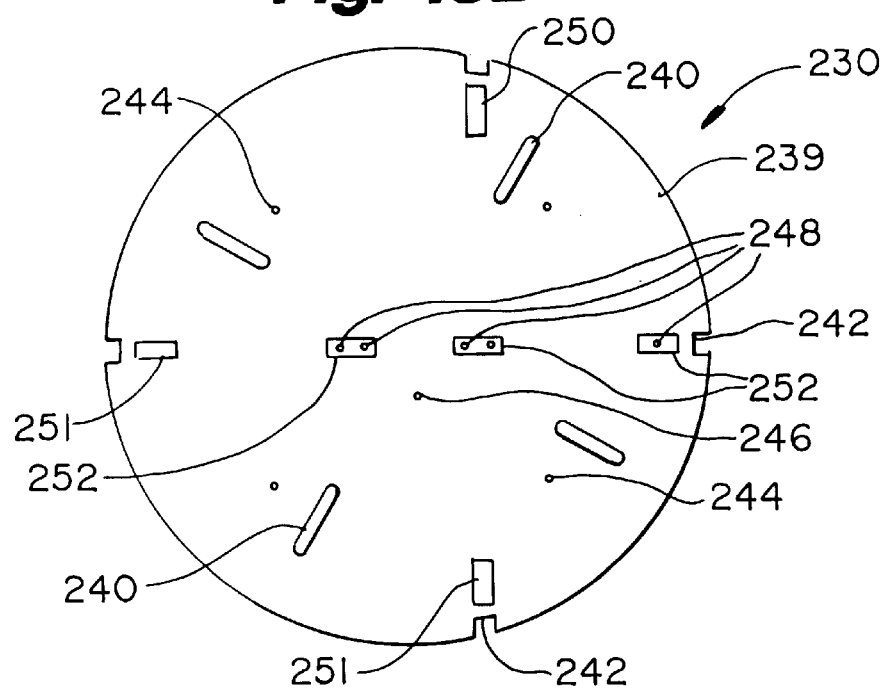
FIG. 13B is bottom view of the top disk of the radiator sub-assembly.

Top disk 230 is depicted in detail in FIGS. 13A and 13B. Top disk 230 is preferably made of FR4 printed circuit board material and is preferably, approximately, three inches in diameter. Top side 238 of top disk 230 is preferably a full metal layer while any exposed areas on top side 238 or bottom side 239 are preferably coated with a corrosion resistant material.

Top side 238 of top disk 230 is shown in FIG. 13A. Top side 238 preferably incorporates four holes/slots 240 to allow for insertion and positioning of radome support ribs/tabs 70. Top side 238 also preferably incorporates four alignment notches 242 to enable alignment and positioning of shunt board 234 and spacer board 236. Pinpoint location holes preferably include four fixturing alignment holes 244, an antenna feed point hole 246 for antenna feed connection 15 from telemetry board 19 and five inductive shunt feed-through holes 248.

Bottom side 239 of top disk 230 is shown in FIG. 13B. In addition to the features described with respect to top side 238, bottom side 239 preferably incorporates selected traces for a capacitance tuning pad 250, shunt board/spacer board electrical connections 252, and shunt board/spacer board mechanical connections 251.

Figure 14A:
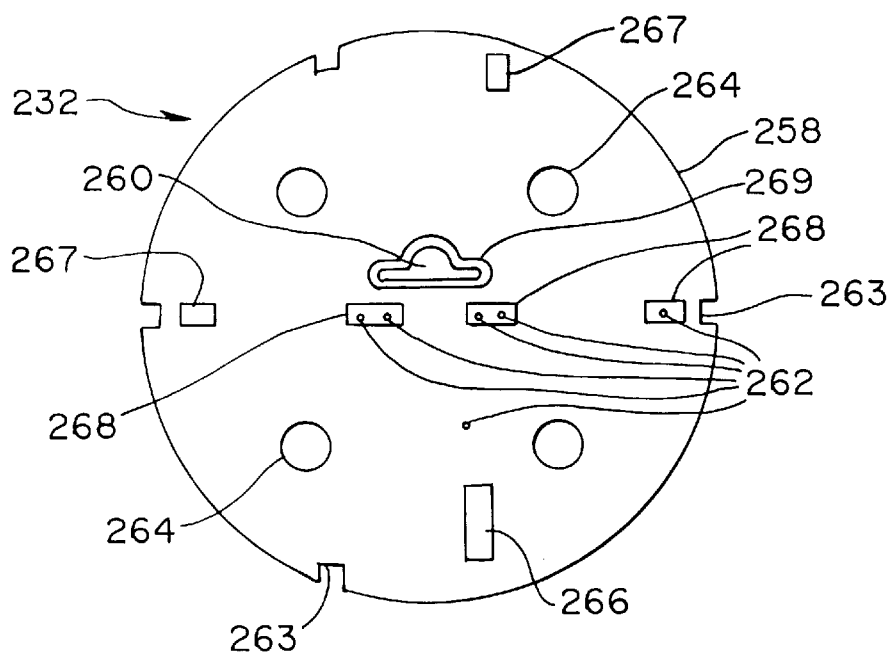
FIG. 14A is a top view of a bottom disk of the radiator sub-assembly.
Figure 14B:
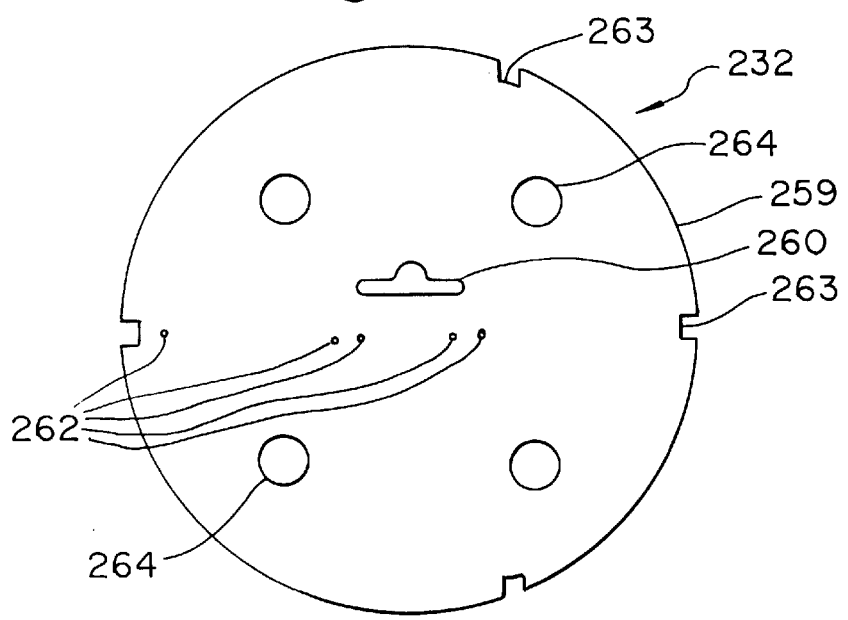
FIG. 14B is a bottom view of the bottom disk of the radiator sub-assembly.

Bottom disk 232 is depicted in detail in FIGS. 14A and 14B. Similar to top disk 230, bottom disk 232 is preferably made of FR4 printed circuit board material and is preferably, approximately, three inches in diameter. Bottom side 259 of bottom disk 232 is preferably a full metal layer while any exposed areas on top side 258 or bottom side 259 are preferably coated with a corrosion resistant material.

Bottom side 259 of bottom disk 232 is shown on FIG. 14B. Bottom side 259 preferably incorporates a slot 260 into which telemetry board 19 may be inserted. An antenna feed connection 15 from telemetry board 19 feeds through slot 260 to antenna feed point hole 246 of top disk 230 where it preferably is soldered in place. Note that the ground of telemetry board 19 preferably is soldered to the straight edge of slot 260. Bottom side 259 also preferably includes five shunt feed-through holes 262. Four holes 264 preferably are provided for tooling bosses on base 24. Further, bottom side 259 also preferably incorporates four alignment notches 263 to enable alignment and positioning of shunt board 234 and spacer board 236.

Top side 258 of bottom disk 232 is shown in FIG. 14A. In addition to the features described with respect to bottom side 259, top side 258 preferably incorporates selected traces for a capacitance tuning pad 266, shunt board/spacer board electrical connections 268, shunt board/spacer board mechanical connections 267 and telemetry board connections 269, antenna feed common.

Figure 15:
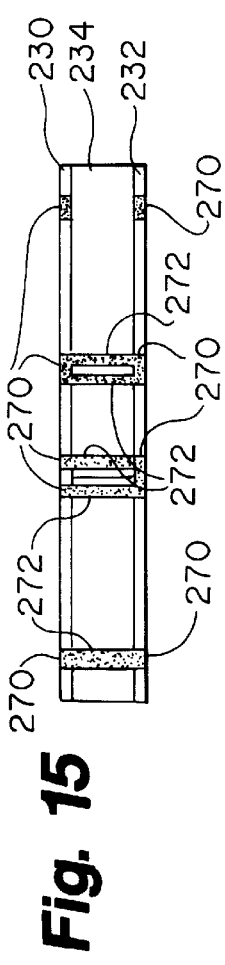
FIG. 15 is a side section view of a shunt board of the radiator sub-assembly.

FIG. 15 provides a side view of shunt board 234. Shunt board 234 preferably is made of FR4 printed circuit board material and is designed to interlock with spacer board 236. Shunt board 234 preferably is provided with edge plating 270 in eight positions so as to connect to four of the traces 252 on top disk 230 and four of the traces 268 on bottom disk 232. Additionally, shunt board 234 preferably is provided with five pairs of inductive tuning shunt traces 272.

Figure 16:
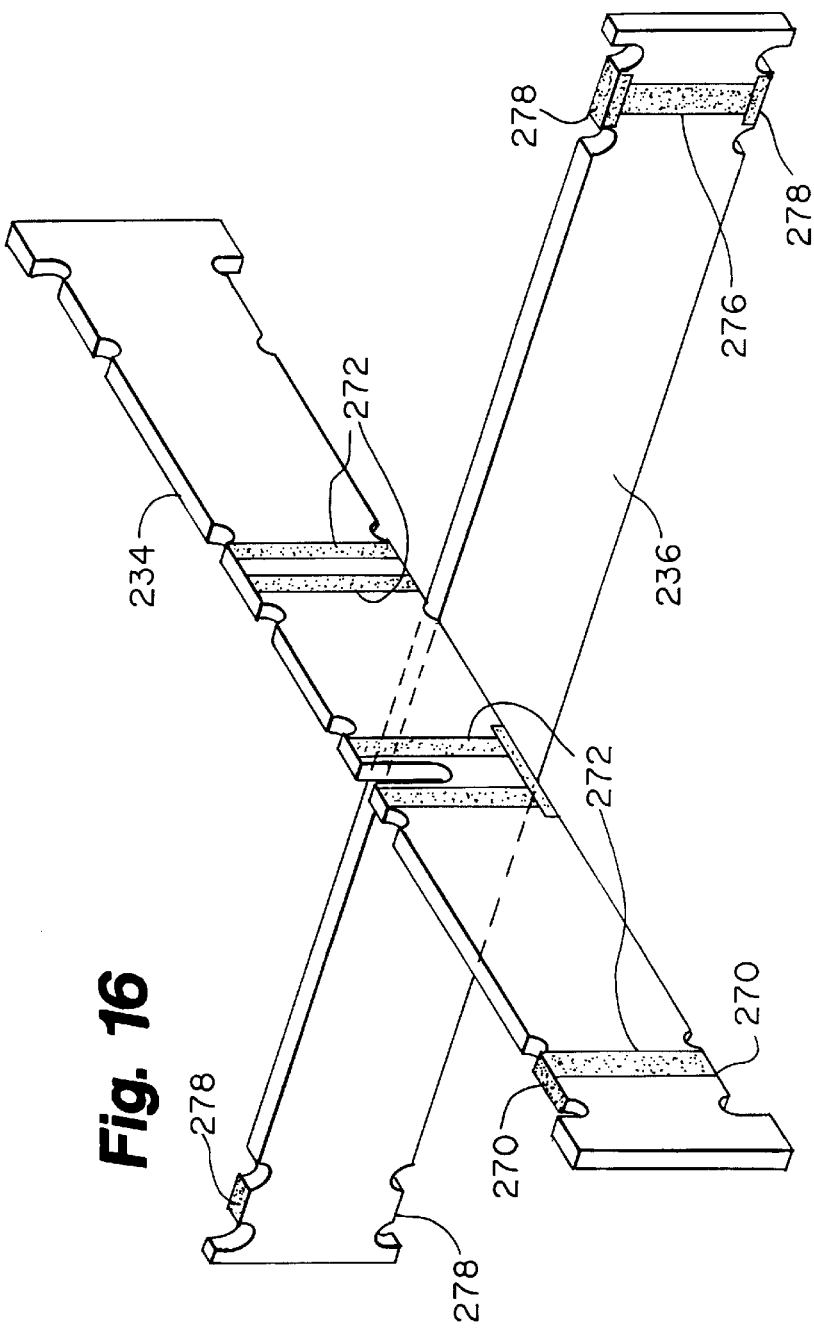
FIG. 16 is a perspective view of the shunt board interlocked with a spacer board of the radiator sub-assembly.

FIG. 16 provides a perspective view of the interlocking position of shunt board 234 and spacer board 236. As with shunt board 234, spacer board 236 preferably is made of FR4 printed circuit board material. Spacer board 234 is preferably provided with a shunt pair 276 to connect the capacitive tuning pads 250, 266 of the top 230 and bottom 232 disks, respectively, and with edge plating 278 in four positions so as to connect the remaining traces on top disk 230 and bottom disk 232. The interlocked boards 234, 236 are placed between top disk 230 and bottom disk 232 connecting thereto with notches 242 and 263, respectively.

In view of the above, the radiator sub-assembly 18 preferably comprises: 1) two circular, parallel, metal surfaces namely top disk 230 and bottom disk 232; 2) a plurality of metal inductor strips namely, shunts 272 and 276, connecting the top disk 230 and bottom disk 232; 3) one or more trimming/tuning capacitors created by pads 250 and 266 and shunt 276; 4) an air gap dielectric between top disk 230 and bottom disk 232; 5) features for locating and interconnecting to telemetry board 19 and for locating to housing assembly 22 and radome 26 namely, holes and slots 240, 242, 244, 246, 248, 260, 262, 263 and 264; and 6) other metal or dielectric materials or elements to connect, support and complete the structure, such as traces 252, 268 and 269. Radiator sub-assembly 18 components, i.e. top disk 230, bottom disk 232, shunt board 234 and spacer board 236, preferably are joined together with conventional soldering techniques and fixtures.

Note that full metallization of the upper surface of top disk 230 and the lower surface of bottom disk 232 constitute the two metal "plates" of the radiator sub-assembly 18 and create the "edge gap" that radiates. The inductive shunts 272 are formed by metallization on inductive shunt board 234. Trim/tuning capacitors are formed by metallization pads 250, 266 on top disk 230 and bottom disk 232 and by inductive shunts 276 connecting the two pads 250, 266 via spacer board 236. However, it is desirable to place all of the tuning and matching metallization on a single inductive shunt board 234, so as to minimize the number of components that are stocked for differing frequency bands.

While the boards 230, 232, 234 and 236 have been described as preferably made from FR4 printed circuit board material, the four boards, 230, 232, 234 and 236, alternatively may be made of sheet metal and suitable insulating material. Additionally, while the radiator sub-assembly has been described in relation to utility meters, valves and pit assemblies, the radiator sub-assembly has additional far reaching uses and applications.

Figure 12:
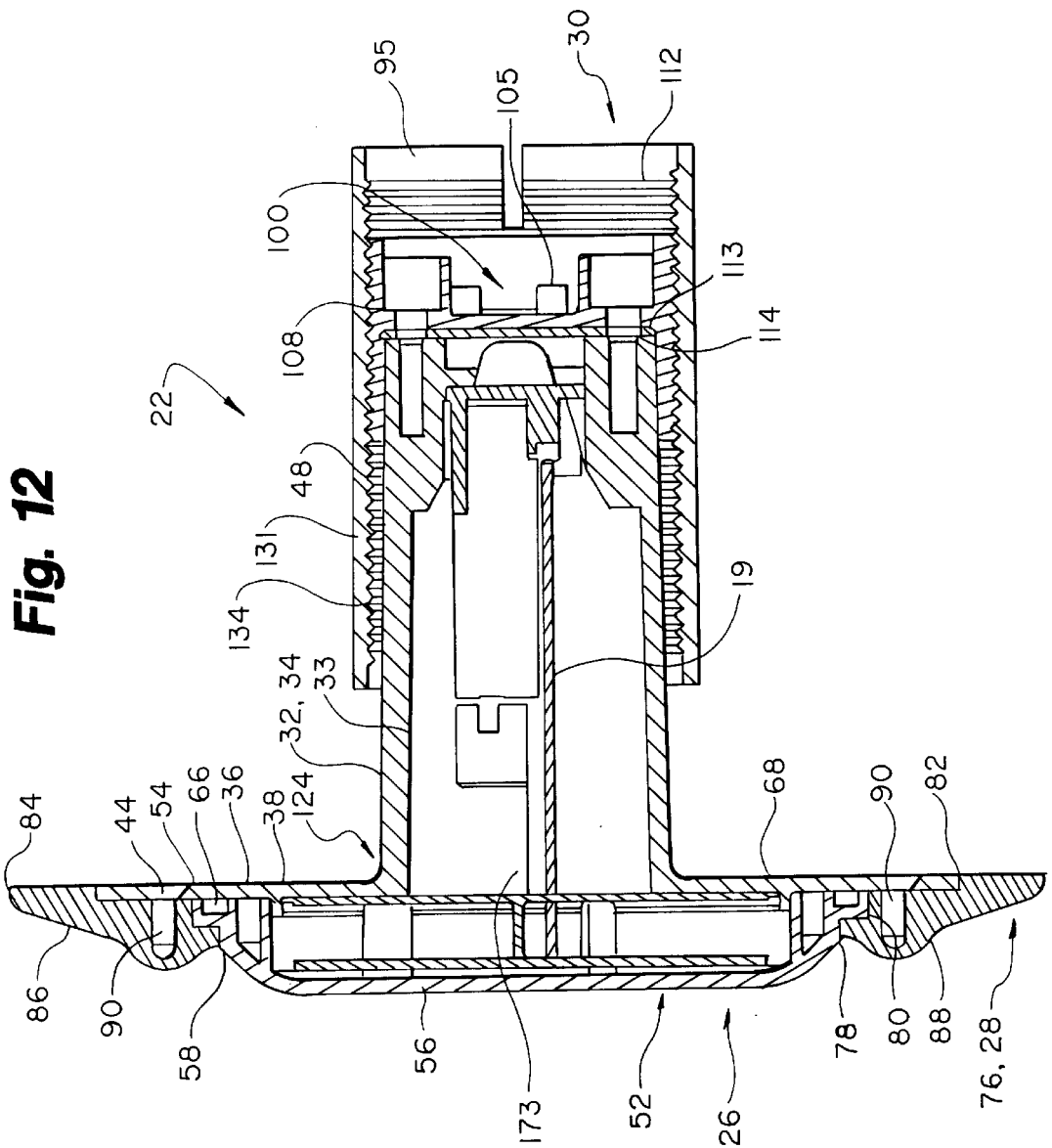
FIG. 12 is cross sectional view of the present invention taken along line 12—12 of FIG. 4A.

Telemetry antenna system 10, shown in FIG. 1A with bulkhead 200 and in FIG. 12 with spine 156, preferably is assembled as follows. Radome 26 is preferably placed, in an inverted position, into retainer ring 28. 0-ring 67 is placed in o-ring groove 66. Referring to FIG. 12, spine 156 is mounted to radiator sub-assembly 18 and to telemetry board 19 (which has already been soldered to radiator sub-assembly 18). Battery 23, spine 156 and radiator sub-assembly 18 are placed on tabs 70 of radome 26. Base 24 is slid over telemetry board 19, battery 23 and spine 156. Screws 92, or other appropriate fasteners, are secured to annular plate 36 and retaining ring 28 to complete assembly of base 24 to radome 26 and retainer ring 28. Alternatively, referring to FIG. 12, bulkhead 200 is mounted to telemetry board 19 (which has already been soldered to radiator sub-assembly 18) and battery 23 is located within battery retaining walls 204. Radiator sub-assembly 18 is placed on tabs 70 of radome 26. Base 24 is slid over telemetry board 19, battery 23 and bulkhead 200. Screws 92, or other appropriate fasteners, are secured to annular plate 36 and retaining ring 28 to complete assembly of base 24 to radome 26 and retainer ring 28.

Next, end cap gasket 114 is installed by pulling bulbous portions 124 through end cap gasket holes 106 to lock gasket 114 in place. Cable 13 with cable connector 17 are installed in channel hole 116. Cable connector 17 is then preferably sealed with rapid curing medium viscosity material. Cable 13 is then dressed and housing assembly 22 is potted.

When on-site the above-completed assembly is preferably installed through a pit lid 16 hole. Base lock 31 is fitted around end cap 30. Base lock screws (not shown) are then preferably loosely installed. Base lock 30 is then snugged to annular plate 36 by the twisting of base lock 31. Base lock is then preferably secured by tightening screws and installing keepers (not shown) so as to make the assembly tamper proof. Appropriate electrical connections are then made between cable 13 and utility meter 14 and/or a valve.

In operation, radiator sub-assembly 18 receives a signal from a host. This signal is a wake-up call to telemetry board 19. Telemetry board 19 responds by transmitting, by radio frequency, an identification signal and meter data from the attached meter 14. The transmission from telemetry board 19 is radiated out from radiator sub-assembly 18 for reception by the host. The telemetry board 19 is powered by battery 23. Alternatively, the telemetry board 19 may continuously transmit meter data, without initial polling, however this causes a significant drain on battery 23.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed:

1. A radiator assembly for radiating a signal from a telemetry device, the radiator assembly comprising:
   a first plate having a conductive surface, the first plate being operably connected to the telemetry device;
   a second plate having a conductive surface, wherein the second plate is separated from the first plate by an air gap dielectric; and at least one inductive shunt connecting the conductive surface of the first plate and the conductive surface of the second plate.

2. The radiator assembly of claim 1, wherein the telemetry device is connected to a meter that is located underground.

3. The radiator assembly of claim 1, wherein the first plate and the second plate are in substantially parallel disposition.

4. The radiator assembly of claim 1, wherein the first plate and the second plate further each include a respective trimming capacitor.

5. The radiator assembly of claim 4, wherein the trimming capacitors on the first and second plates are connected together by at least one inductive shunt.

6. The radiator assembly of claim 1, wherein the at least one inductive shunt is located on a shunt board positioned between the first plate and the second plate.

7. The radiator assembly of claim 1, wherein the first plate and the second plate are separated by a shunt board, and wherein the at least one inductive shunt comprises a plurality of inductive shunts that are placed in a symmetrical pattern across the shunt board.

8. The radiator assembly of claim 1, wherein the first plate has a center and wherein the telemetry device has an antenna feed point connection, the antenna feed point connection being connected to the first plate at a location spaced apart from the center.

9. A container assembly for housing a telemetry device and a radiator assembly operably connected to the telemetry device, wherein the telemetry device is operably connected to a utility meter located below a ground level surface, the container assembly comprising:
a housing having a top end, a bottom end, and a chamber defined between the top and bottom ends, the housing further having an integral plate extending outward from the periphery of the top end, wherein the integral plate has a top surface and a bottom surface and wherein the bottom surface is designed to rest atop the ground level surface, the chamber extending below the bottom surface of the integral plate;
a cover lying atop the top surface; and
a cover retainer, wherein the cover retainer releasably secures the cover to the top surface of the integral plate whereby the cover effects a substantially water-tight seal with the top surface of the integral plate.

10. The container assembly of claim 9, wherein the cover retainer surrounds the periphery of the cover.

11. The container assembly of claim 9, wherein the housing is made from a metal or metallized material.

12. The container assembly of claim 9, wherein the housing shields a portion of radio frequency emissions.

13. The container assembly of claim 9, wherein the integral plate operates as a ground plane for the radiator assembly.

14. The container assembly of claim 9, wherein the cover includes tabs for support against compressive loads.

15. The container assembly of claim 9, wherein the housing further includes a lip edge and the cover further includes a seating edge and wherein the seating edge and the lip edge combine to prevent the cover from sliding atop the integral plate.

16. The container assembly of claim 9, further comprising an end cap, wherein the end cap is releasably secured to the bottom end of the housing.

17. The container assembly of claim 16, further comprising a housing lock, wherein the housing lock is secured about the end cap.

18. The container assembly of claim 17, wherein the housing lock operates to make the container assembly substantially tamper proof.

19. The container assembly of claim 9, further comprising a spine housed within the chamber.

20. The container assembly of claim 19, wherein the telemetry device is mounted to the spine.

21. The container assembly of claim 9, further comprising a bulkhead housed within the chamber.

22. The container assembly of claim 9, wherein the cover together with the cover retainer present a substantially smooth profile above the ground level surface.

23. A telemetry antenna system for transmitting data from an apparatus, the telemetry antenna system comprising:
a telemetry device operably connected to the apparatus;
a radiator assembly comprising:
a first plate having a conductive surface, the first plate operably connected to the telemetry device;
a second plate having a conductive surface, wherein the second plate is separated from the first plate by an air gap dielectric; and
at least one inductive shunt connecting the conductive surface of the first plate and the conductive surface of the second plate; and
a housing assembly wherein the housing assembly houses the telemetry device and the radiator assembly.

24. The telemetry antenna system of claim 23, wherein the first plate and the second plate further each include a respective trimming capacitor.

25. The telemetry antenna system of claim 23, wherein the first plate and the second plate are separated by a shunt board and wherein the at least one inductive shunt comprises a plurality of inductive shunts that are placed in a symmetrical pattern across the shunt board.

26. The telemetry antenna system of claim 23, wherein the housing assembly comprises a base portion for housing the telemetry device, a cover for housing the radiator assembly, the cover resting atop the base portion, and a cover retainer, wherein the cover retainer is releasably secured to the base portion whereby the cover effects a substantially water-tight seal with the base portion.

27. The telemetry antenna system of claim 26, wherein the base portion operates to shield a portion of radio frequency emissions.

28. The telemetry antenna system of claim 26, wherein the base portion operates as a ground plane for the radiator assembly.

* * * * *

UNITED STATES PATENT AND TRADEMARK OFFICE
CERTIFICATE OF CORRECTION

PATENT NO.   : 6,218,995 B1
DATED        : April 17, 2001
INVENTOR(S)  : Higgins et al.

It is certified that error appears in the above-identified patent and that said Letters Patent is hereby corrected as shown below:

<u>Column 1,</u>
Line 10, delete "meter," and insert -- meters, --.
Line 21, after "sidewalk" insert a comma.

<u>Column 2,</u>
Line 33, after "together." begin a new paragraph.

<u>Column 3,</u>
Lines 10 and 14, after "is" insert -- a --.

<u>Column 4,</u>
Line 36, delete "0-ring" and insert -- O-ring --.

<u>Column 6,</u>
Line 17, delete "B" and insert -- 1B --.
Line 63, delete "on" and insert -- in --.

<u>Column 8,</u>
Line 10, delete "0-ring" and insert -- O-ring --.

Signed and Sealed this

Fourth Day of December, 2001

*Attest:*

*Attesting Officer*

NICHOLAS P. GODICI
*Acting Director of the United States Patent and Trademark Office*